Jan. 8, 1946.  W. I. DENTON ET AL  2,392,466
PRODUCTION OF STYRENE
Filed May 26, 1943
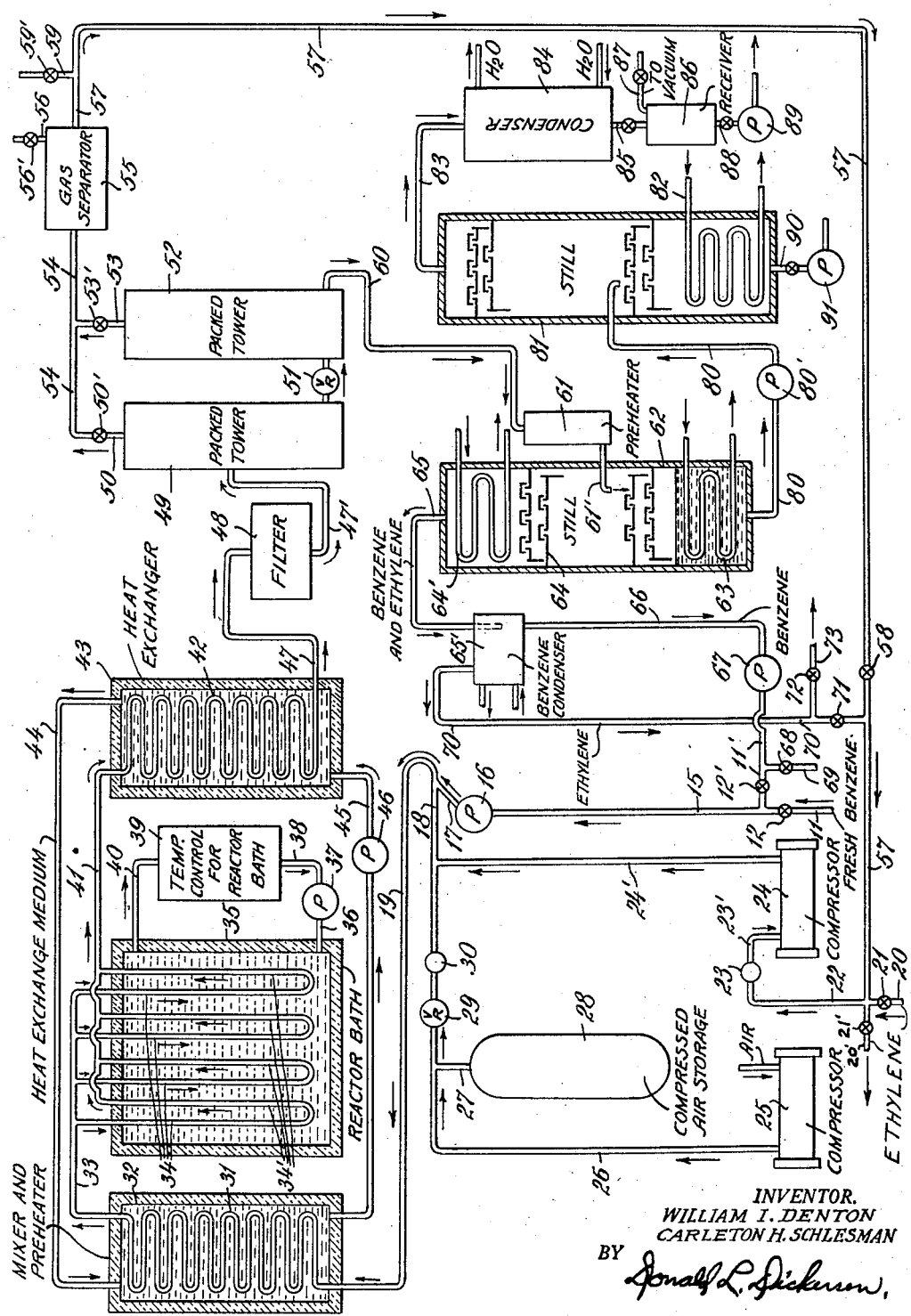
INVENTOR.
WILLIAM I. DENTON
CARLETON H. SCHLESMAN
BY
Donald L. Dickerson,
ATTORNEY

UNITED STATES PATENT OFFICE 2,392,466

PRODUCTION OF STYRENE

William I. Denton, Woodbury, and Carleton H. Schlesman, Camden, N. J., assignors to Socony-Vacuum Oil Company, Incorporated, a corporation of New York Application May 26, 1943, Serial No. 488,528

6 Claims. (Cl. 260—669)

This invention has to do with the production of styrene from benzene and ethylene, and is more particularly concerned with that type of process wherein a reaction mixture consisting of benzene, ethylene and oxygen, or oxygen containing gas such as air, is passed through a reaction zone under pressure and at elevated temperature.

It is well known to those familiar with the art that styrene has been, and is presently being, obtained by means of several chemical processes, all of which involve two or more reaction stages. In these processes the initial reaction stage involves contacting benzene with ethylene or ethyl alcohol in the presence of a catalyst, such as a mineral acid or a Friedel-Crafts type catalyst, to form ethyl benzene. The second reaction stage involves a dehydrogenation of ethyl benzene to styrene, such dehydrogenation being effected thermally or in the presence of a suitable catalyst. As a modification of this second stage, styrene may also be obtained from ethyl benzene by subjecting the latter to a combined chlorination and dehydrochlorination treatment. Although multiple-stage processes of the foregoing type provide satisfactory yields of styrene, this product is relatively expensive in view of the cost involved in using several reaction stages, catalyst, etc. As a result of this situation, considerable work has been carried out in an effort to produce styrene, at low cost, directly from benzene and ethylene in a simple one-stage process. It is with this type of process that this invention is concerned.

The present invention is predicated upon the discovery of a one-stage process for the production of styrene directly from benzene and ethylene. The process contemplated herein involves passing a vapor phase reaction mixture of benzene, ethylene and an oxygen-containing gas such as oxygen or air, through a reaction zone under certain conditions of pressure and temperature whereby substantial portions of the benzene and ethylene react to form styrene. The reaction product obtained by this process contains an appreciable amount of styrene in admixture with other valuable chemicals, such as phenol, diphenyl, alkyl benzenes, etc. As will appear hereinafter, styrene may be readily separated from the other materials of the reaction mixture by distillation or other suitable separation procedures.

Although the mechanism of the reaction involved in the present process is not completely understood, it most probably involves the removal of a hydrogen atom of the benzene nucleus by oxygen. The phenyl radical thus formed is then free to unite with any radicals present. Since the oxygen present may also remove a hydrogen atom from the ethylene, the radical

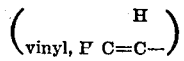

thus formed may then unite with the phenyl radical to form styrene. In a like manner, phenol may be formed by the union of a phenyl radical and a hydroxyl radical. This, however, is speculation only and the invention is not to be construed as limited by any theory regarding the reaction mechanism.

As contemplated herein, the production of styrene is largely controlled by several variables, included among which are: pressure-temperature-reaction time relationships, ratio of oxygen or air to hydrocarbons (benzene and ethylene), and ratio of benzene to ethylene. In general, the pressure should be superatmospheric and should be maintained at from about 10 atmospheres to about 200 atmospheres for satisfactory yields of styrene. Temperatures of the order of about 600° F. to about 1100° F. are used with such pressures. The reaction time, or the time taken by a molecule in passing through the reactor zone under the aforesaid operating conditions of pressure and temperature, is from about a fraction of a second to several minutes; preferred, however, are reaction times of from 1 second to about 1 minute. It is to be understood, however, that these reaction conditions are all interrelated. For instance, the higher the temperature, the shorter the reaction time, other conditions being the same. Similarly, the higher the pressure, the lower the temperature required for a desired degree of reaction.

With regard to the ratios of reactants, it has been found that the reaction mixture should contain a limited amount of oxygen. In general, the amount of oxygen should be sufficient to react with at least part of the ethylene and of the benzene used; and, for example, may be a stoichiometrical amount. It is desirable to maintain a molar ratio of hydrocarbon to oxygen of at least about 2:1 and preferably about 4:1, for with greater amounts of oxygen losses to oxides of carbon are increased. The molar ratio of benzene to ethylene in the reaction mixture should be between 10:1 and about 1:5 inasmuch as larger proportions of ethylene give rise to polymerization products, and larger proportions of benzene give rise to benzene oxidation products.

While oxygen and air are particularly preferred herein for use in this vapor phase process for the production of styrene from benzene and ethylene, other materials which are in the vapor phase under the reaction conditions defined herein and which react with hydrogen of said benzene and ethylene are contemplated for use. By way of illustration, sulfur may be used in place of oxygen or air.

With regard to the composition of the reaction zone or, as hereinafter illustrated, the reactor tubes, it is desirable that these be of a material which will have no substantial catalyzing effect in accelerating the oxidation of benzene, for this will detract from the conversion of benzene to styrene. At the relatively high temperatures, (800–1100° F.), used with relatively low pressures, (10–20 atmospheres), the use of extremely inert (non-catalytic) inner surfaces of the reactor tubes, such as glass, enamel, glazed porcelain, or silica, is particularly desirable. At moderate pressures, 20–35 atmospheres, nickel is satisfactory. At pressures of from about 35 to about 200 atmospheres, low-carbon steel and stainless steel are satisfactory; nickel presents no advantage at such pressures. The internal diameter of the reactor tubes may vary considerably; satisfactory results have been obtained with tubes varying from 0.1 inch to 1 inch in internal diameter. It is preferred that the reactor tubes be void of solid catalysts especially those which promote the oxidation of hydrocarbons. However, other types of catalysts such as dehydrogenating catalysts may be used in this process.

It will be understood that the process contemplated herein can be used as a batch operation or as a continuous operation, the latter being particularly preferred. It will be apparent that with both types of operation a properly proportioned mixture of benzene, ethylene and oxygen or air, is thoroughly mixed and preheated to the desired temperature and passed through a reactor tube which has been preheated and which for the purpose of preheating and dissipating the heat of the exothermic reaction is immersed in a suitable heat-transfer bath such as salt. While the reactants are thoroughly mixed when preheated and vaporized together, they may also be so mixed by separately preheating and vaporizing one, or all, of the individual reactants, and then bringing them together. The reaction mixture, as indicated above, is maintained under pressure. With properly regulated conditions substantial portions of the benzene and of the ethylene used, are thus converted to styrene. Thus styrene is obtained in admixture with gaseous and high-boiling reaction products and is then separated therefrom by one of several available separation procedures.

We have found that the method of separating the liquid reaction product, containing benzene, styrene and high-boiling reaction products, from the unreacted charge and spent gas will depend, to a large degree, upon the operating conditions. When the higher range of benzene-ethylene molar ratios and the higher pressures described hereinabove are used, the reaction product may be cooled, as to about 20–25° C., so that the greater part of the unreacted ethylene will dissolve in the unreacted benzene. Hence, by use of a gas separation, unreacted oxygen, (and nitrogen if air was used in place of oxygen per se), and oxides of carbon may be purged from the reaction product. The liquid product remaining after the removal of said gases may then be distilled to remove unreacted benzene and unreacted ethylene, and the residue may then be further distilled, as under reduced pressure, to obtain styrene and other materials therefrom.

In the preferred continuous operation contemplated herein, the reaction product from the reactor can be separated into its individual constituents by means of the separation procedure described above; however, it will be obvious that the unreacted ethylene and unreacted benzene which are recovered from the reaction product will be condensed and recycled in a subsequent operation with fresh oxygen or air.

When the lower reaction pressures and lower benzene-ethylene molar ratios are used, the foregoing separation procedure is modified in order to recover all of the unreacted ethylene. In such a case, the reaction product from the reactor is cooled to about 20–25° C. whereupon the greater part of the unreacted ethylene dissolves in the liquid reaction product. The gases which do not condense at such a temperature are unreacted oxygen, (nitrogen if air had been used), oxides of carbon and some unreacted ethylene. These uncondensed gases are then passed through a scrubber of the conventional type in order to separate and recover unreacted ethylene. The condensed or liquid reaction product free of said gases is thereafter distilled as described above.

As will be readily apparent to those skilled in the art, the apparatus used in carrying out a process of the type contemplated herein may take various forms. In the accompanying drawing, however, we have shown diagrammatically one form of apparatus which may be satisfactorily used in carrying out an operation for the continuous conversion of benzene and ethylene to styrene. In the drawing we have shown air as the source of oxygen required in this process. However, it will be understood that any other suitable oxygen-containing gas, or pure oxygen, could just as well have been used as an illustration. As indicated hereinabove, the conditions of operation embody a number of variables which may be changed with respect to one another over certain limits, and no attempt will be made in describing the apparatus to take account of these possible changes in variables.

Referring now to the drawing, reference numerals 11 and 11' indicate conduits which carry benzene and are connected through suitable valves 12 and 12' with the inlet 15 of a pump 16. The pump 16 delivers the benzene through a conduit 17 to a three-way connection 18, where it is introduced into a mixture conduit 19 leading to the coils 31 of a mixer and preheater mounted in an insulated case 32 which is filled with a suitable heat-exchange medium such as "salt." Reference numeral 25 indicates an air-compressor which discharges into pipe 26 connected through the connection 27 to a compressed-air storage reservoir 28. The pipe 26 discharges through a pressure-reducing valve 29 and an orifice flow-control 30 into the conduit 19. Reference numeral 20 indicates a conduit which introduces fresh ethylene through a suitable valve 21 into the system shown. Conduit 20' and valve 21' are means by which unreacted, recycled ethylene can be removed from said system, said ethylene being carried through conduit 57 into conduit 22 as hereinafter described. The ethylene in conduit 22 is carried through a metering control 23 and conduit 23' to the compressor 24 which discharges through conduit 24' into conduit 19.

The preheating and mixing coil 31, wherein the benzene-ethylene-air mixture is intimately mixed and preheated to a temperature below the temperature at which the reaction will take place, discharges into a header 33, which connects with a series of reactor tubes 34. The reactor tubes are suspended in a suitable heat-transfer bath, such as a fused salt bath, capable of maintaining a close temperature control, such bath being contained in the insulated case 35, which is provided with an inlet conduit 36 having a pump 37, the inlet 38 of which connects with a heat-exchanger 39 which can be used to raise the temperature of the salt bath for initiating the reaction and, after the exothermic reaction has started, can be used to dissipate the heat of reaction and maintain a constant temperature. The heat-exchanger 39 receives the heat-exchange medium from the tank 35 through a discharge conduit 40.

In the form of the apparatus shown in the drawing, the reactor tubes are illustrated as being U-shaped, and the discharge portion 34' of the respective reactor tubes connect with a header conduit 41 which discharges into the coil 42 of a heat-exchanger 43. For the thermal balance of the process this heat exchanger 43 is shown as being connected through conduits 44 and 45 with the mixer and preheater 32 so that the heat-exchange medium is circulated by means of pump 46 from the bottom of the mixer and preheater 19 to the bottom of the heat-exchanger 43 and back to the mixer and preheater through the pipe 44.

The cooled reaction mixture containing styrene and other products of the reaction discharges from the heat exchanger 43 through pipe 47—47' and filter 48 into a high-pressure mist-breaking tower 49 having a high-pressure gas-discharge outlet 50 and valve 50'. The gases discharged through valve 50' into conduit 54 are nitrogen, oxides of carbon, some unreacted oxygen and some unreacted ethylene. Discharge valve 50' is controlled by orifice flow-control 30 to maintain a constant flow of air in pipe 19. The liquid product accumulating in the bottom of the high-pressure tower 49 is conducted through a pressure-reducing valve 51 into a low-pressure packed tower 52 provided with a vent 53 fitted with a valve 53' to release gaseous products containing some unreacted ethylene. The gaseous products containing some unreacted ethylene are then conducted through conduit 54 to a gas separator 55 wherein ethylene is separated from other gases, such as oxides of carbon, nitrogen and unreacted oxygen, which are removed through the line 56 and valve 56'. Unreacted ethylene from the separator 55 is conducted through conduit 57 and valve 58 to the ethylene stream in conduit 22. Unreacted ethylene may be removed from the system, if desired, through conduit 59 and valve 59'.

The liquid product accumulating in the bottom of the tower 52 is discharged through conduit 60. This liquid product, which is a mixture of styrene, unreacted benzene, some unreacted ethylene, phenol, diphenyl and other reaction products, is delivered to the benzene-recovery still 62. In the still as illustrated, the liquid products pass through a preheater 61 and are discharged through the discharge pipe 61' into the still 62, where the benzene and any dissolved ethylene are distilled off by a steam coil reboiler 63. The still 62 is shown as being equipped with bubble plates 64 and a water coil reflux-condenser 64'. The benzene and any ethylene vapors are discharged through conduit 65 into a benzene condenser 65', from which the liquid product discharged through conduit 66 is pumped by means of pump 67 into benzene conduit 11'. Valve 68 and conduit 69 are provided to remove recycle benzene if desired. Ethylene distilled with benzene from still 62 is not condensed in the benzene condenser 65', and discharges from this condenser (65') through conduit 70. Ethylene so recovered can be returned to the ethylene stream (in conduit 22) by means of valve 71 and conduit 57. Also, if desired, this recovered ethylene can be removed from the system through valve 72 and conduit 73.

The bottom of the benzene-recovery still 62 is provided with a discharge conduit 80 through which the mixture of styrene and other reaction products is pumped by pump 80' into a fractionating still 81, wherein styrene is separated from the other reaction products such as phenol, diphenyl, alkyl benzenes and tar. Styrene, for example, is distilled off by means of the steam reboiler coil 82 into the discharge conduit 83, which connects with the condenser 84 from which the condensed styrene is discharged through the conduit 85 into a receiver 86 provided with a valved discharge pipe 88 connected with a discharge pump 89. The receiver 86 is also provided with a valved vacuum line 87 in the event that reduced pressure is to be maintained in the still. The higher-boiling products, phenol, diphenyl, some alkyl benzenes and tar, are discharged from the still 81 through the conduit 90 by means of a pump 91.

The process contemplated by the present invention is illustrated by the following example in which an apparatus of the type shown in the drawing and described herein was used.

*Example*

A reaction mixture of benzene, ethylene and air was obtained by passing 100 mols per hour of benzene, 100 mols per hour of ethylene and 250 mols per hour of air (i. e., about 50 mols per hour of oxygen) in the vapor phase into a preheating and mixing coil. This reaction mixture, in the vapor phase, was then passed through a reactor tube consisting of a 60 foot length of 0.25 inch stainless steel pipe immersed in a bath of molten salt at 700° F. The pressure was maintained at about 750 pounds per square inch which provided a reaction time of approximately 8 seconds. Of the hydrocarbons charged to the reactor, 27.5 weight per cent was converted per pass, and of this, 21 weight per cent represented crude liquid product and 6.5 weight per cent represented loss to oxides of carbon and water. Therefore, the yield of crude liquid product was 76 weight per cent of the hydrocarbon converted. On analysis it was found that the crude product contained the following:

| Component | Wt. percent of crude product |
|---|---|
| Styrene | 14 |
| Phenol | 16 |
| Diphenyl | 25 |
| Alkyl benzenes | 22 |
| Tar | 23 |
| | 100 |

It will be seen from the foregoing analysis of the crude product that an appreciable amount of styrene is obtained directly from benzene and ethylene in the present process. It will also be seen that substantial quantities of valuable chemicals are concurrently obtained.

As indicated above, a process of the type contemplated herein is susceptible of numerous operating conditions through manipulation of the variables discussed. It is to be understood, however, that although we have described and illustrated a specific form of apparatus which may be employed in our process, and have described and illustrated our process by a specific example, the invention is not limited to this apparatus or to this example, or to any particular set of operating conditions but includes within its scope such changes and modifications as fairly come within the spirit of the appended claims.

We claim:

1. The process for the direct production of styrene from benzene and ethylene, which comprises: reacting benzene and ethylene in the vapor phase with an oxygen-containing gas, in a heated reaction zone at a temperature between about 600° F. and about 1100° F. under a pressure between about 10 atmospheres and about 200 atmospheres and with a reaction time between about 1 second and about 1 minute, thereby forming a reaction product containing syrene, the amount of said gas being sufficient to react with at least part of the hydrogen of said benzene and of said ethylene; and separating styrene from said reaction product.

2. The process for the direct production of styrene from benzene and ethylene, which comprises: reacting benzene and ethylene in the vapor phase with an oxygen-containing gas containing a stoichiometrical amount of oxygen, in a heated reaction zone at a temperature between about 600° F. and about 1100° F. under a pressure between about 10 atmospheres and about 200 atmospheres and with a reaction time between about 1 second and about 1 minute, thereby forming a reaction product containing styrene; and separating styrene from said reaction product.

3. The process for the direct production of styrene from benzene and ethylene, which comprises: reacting benzene and ethylene in the vapor phase with oxygen, in a heated reaction zone at a temperature between about 600° F. and about 1100° F. under a pressure between about 10 atmospheres and about 200 atmospheres and with a reaction time between about 1 second and about 1 minute, thereby forming a reaction product containing styrene, the amount of said oxygen being sufficient to react with at least part of the hydrogen of said benzene and of said ethylene; and separating styrene from said reaction product.

4. The process for the direct production of styrene from benzene and ethylene, which comprises: reacting benzene and ethylene in the vapor phase with air, in a heated reaction zone at a temperature between about 600° F. and about 1100° F. under a pressure between about 10 atmospheres and about 200 atmospheres and with a reaction time between about 1 second and about 1 minute, thereby forming a reaction product containing styrene; the amount of said air being sufficient to react with at least part of the hydrogen of said benzene and of said ethylene; and separating styrene from said reaction product.

5. The process for the direct production of styrene from benzene and ethylene, which comprises: reacting benzene and ethylene in the vapor phase with air, in a heated reaction zone at about 700° F. and about 50 atmospheres pressure and with a reaction time of about 8 seconds, thereby forming a reaction product containing styrene, the amount of air containing sufficient oxygen to react with at least part of the hydrogen of said benzene and of said ethylene; and separating styrene from said reaction product.

6. The process for the direct production of styrene from a hydrocarbon mixture consisting of benzene and ethylene, which comprises: reacting said hydrocarbon mixture in the vapor phase with air, in a heated reaction zone at about 700° F. and about 50 atmospheres pressure and with a reaction time of about 8 seconds, thereby forming a reaction product containing styrene, the amount of air containing sufficient oxygen to react with at least part of the hydrogen of said benzene and of said ethylene; and separating styrene from said reaction product.

WILLIAM I. DENTON.
CARLETON H. SCHLESMAN